Figure 1:
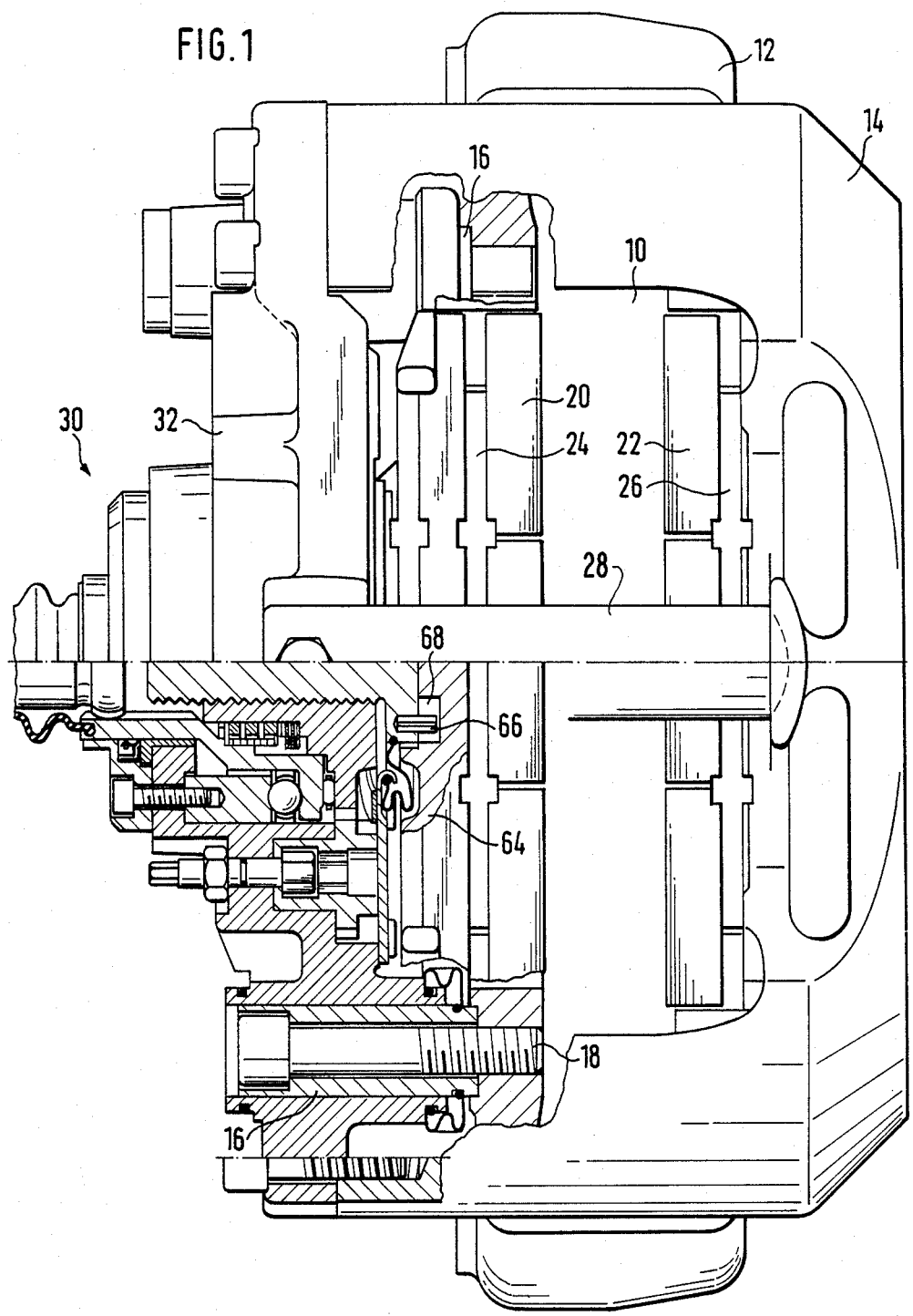

United States Patent [19]

Giering

[11] Patent Number: 4,830,149
[45] Date of Patent: May 16, 1989

[54] ACTUATOR WITH AUTOMATIC ADJUSTMENT AND WITH RESET SHAFT FOR USE IN BRAKES, ESPECIALLY OF HEAVY DUTY VEHICLES

[75] Inventor: Wilfried Giering, Mending, Fed. Rep. of Germany

[73] Assignee: Lucas Industries public limited company, Birmingham, England

[21] Appl. No.: 133,654

[22] Filed: Dec. 16, 1987

[30] Foreign Application Priority Data

Dec. 18, 1986 [DE] Fed. Rep. of Germany ... 8633923[U]

[51] Int. Cl.$^4$ .................... F16D 55/224; F16D 65/56; F16D 13/60
[52] U.S. Cl. ................................ 188/71.9; 188/72.8; 188/73.32; 188/196 V; 192/111 A
[58] Field of Search .................... 188/71.9, 71.8, 72.2, 188/72.7, 72.8, 73.32, 73.33, 73.45, 79.5 GE, 79.5 S, 79.5 K, 196 BA, 196 F, 196 D, 196 V, 79.51, 79.55, 79.62; 192/70.23, 111 A, 111 B, 70.13

[56] References Cited

U.S. PATENT DOCUMENTS 3,998,295 12/1976 Martin ........................ 188/196 M X
4,429,768 2/1984 Margetts et al. ................... 188/71.9

FOREIGN PATENT DOCUMENTS 2035485 6/1980 United Kingdom .
2054075 2/1981 United Kingdom ............... 188/71.9

Primary Examiner—Robert J. Oberleitner
Attorney, Agent, or Firm—Scrivener and Clarke

[57] ABSTRACT

An actuator for brakes with automatic adjustment suitable in particular for heavy duty vehicles comprises a housing (32) whose axis (A) is surrounded by a cam surface (36). A rotary member (40) is rotatable about the housing axis (A) and comprises a second cam surface (42) with which it bears on the first cam surface (36) to produce an axial displacement dependent on its rotation. A first screw member (50) is likewise rotatable about the housing axis and a second screw member (60) is formed to exert an actuating force on a brake pad. The second screw member is connected to the first screw member by a pair of threaded adjustment members (62). A reset shaft (92) is mounted in the housing (32) and permits a screwing back of the two screw members (50, 60) with respect to each other to replace the brake pad. The reset shaft (92) is disposed with lateral spacing from the housing axis (A) and is connected to one of the screw members (50) via a gearing (88, 90).

5 Claims, 2 Drawing Sheets

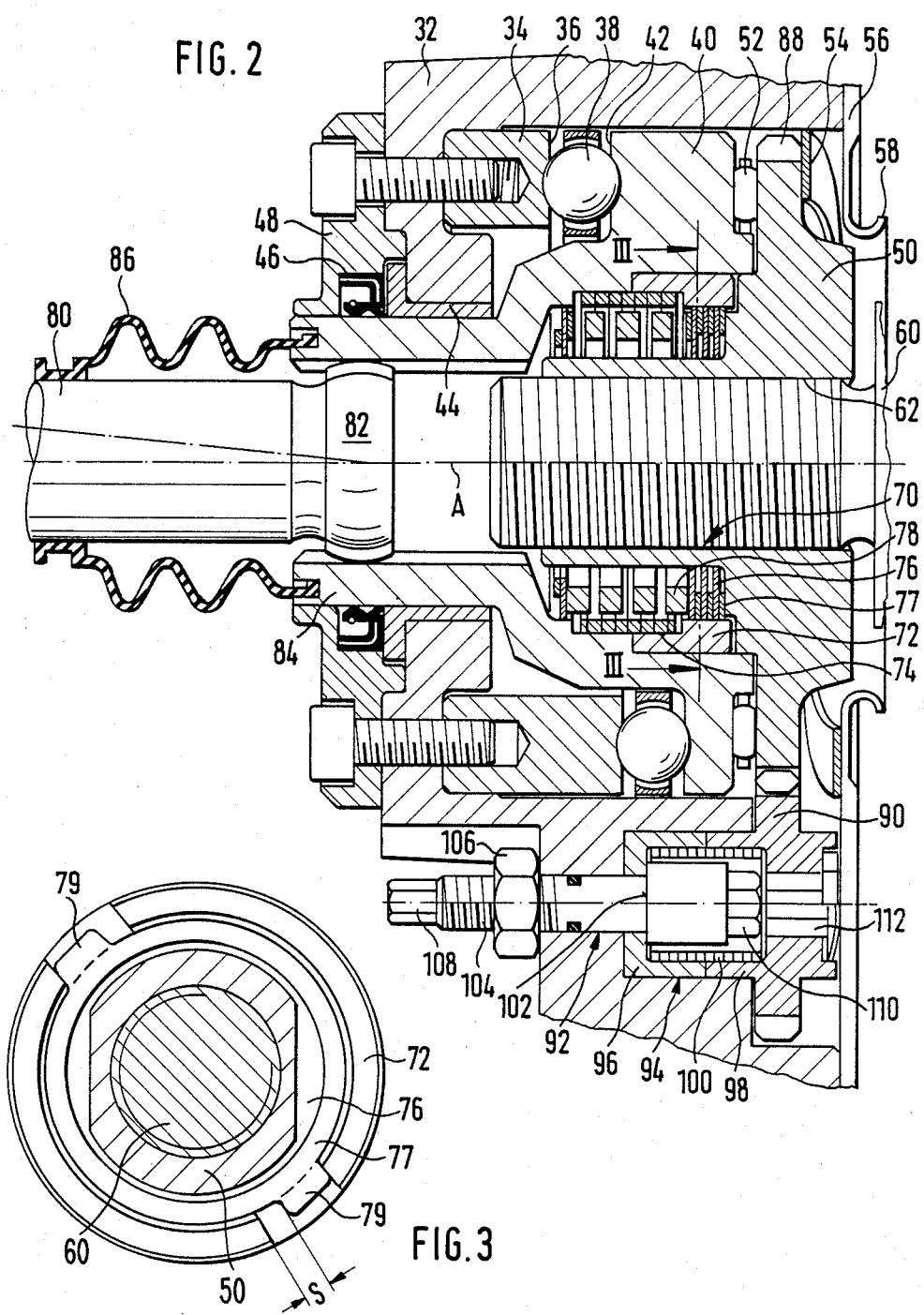

ACTUATOR WITH AUTOMATIC ADJUSTMENT AND WITH RESET SHAFT FOR USE IN BRAKES, ESPECIALLY OF HEAVY DUTY VEHICLES

The invention relates to an actuator with adjustment for use in brakes, especially of heavy duty vehicles, comprising a housing having a housing axis and enclosing a first cam surface arranged circularly around said axis, a rotary member which is adapted to be rotated about the housing axis and which has a second cam surface with which said rotary member is supported at the first cam surface to cause an axial displacement dependent on its rotation, a first screw member that is adapted to be rotated about the housing axis, a second screw member which is constructed so as to exert an actuating force onto a brake pad and which is connected with the first screw member via a pair of adjustment threads, a clutch arrangement adapted to transmit a limited torgue in one rotational direction from the rotary member to the first screw member for the axial adjustment of the brake pad and allowing a counter-rotational movement of the rotary member without the first screw member, and a reset shaft that is journalled within the housing, allows back-screwing of the two screw members with respect to each other for replacing the brake pad, and is adapted to be blocked to prevent any unintended back-screwing during use.

In a known actuator of this type (GB-B No. 2,035,485) the reset shaft is arranged coaxially with the rotary member and the two screw members in a cover of the housing and comprises a portion which is provided with a flattening and engages into a hole of the second screw member provided with a corresponding flattening so that the two are connected together for joint rotation. Mounted on the reset shaft outside the housing cover is a hand wheel which for the normal operation of the actuator is prevented from rotating by a stirrup member detachably secured to the housing. With increasing wear of the brake pad actuated by the second screw member the first screw member on brake actuations is turned by the rotary member via the clutch arrangement stepwise in such a manner that the second screw member moves out of the first screw member an axial distance corresponding to the particular wear and is thereby displaced on the stationary reset shaft without rotating. When the brake pad is worn to such an extent that it is to be replaced by a new pad the stirrup member is detached from the housing and the reset shaft is turned with the hand wheel to such an extent that the second screw member is screwed back into the first screw member.

In actuators of the type described it is necessary to exert a torque on the rotary member for each brake actuation and thereafter a reset torque for releasing the brake. For this purpose the rotary member, before or on installation of the actuator into a vehicle, must be connected to an actuating member. In the known actuator this is complicated and the connection between the actuating member and rotary member requires relatively a great amount of space because the rotary member is arranged difficultly accessible in the housing.

The invention is therefore based on the problem of further developing an actuator of the type described at the beginning in such a manner that the rotary member can be connected simply and compactly to an actuating member associated therewith.

This problem is solved according to the invention in that the reset shaft is disposed with lateral spacing from the housing axis and is connected to one of the screw members via a gearing. In this manner the space occupied in the known actuator according to the preamble by the reset shaft and the handwheel secured thereto in the axial extension of the two screw members becomes free so that an actuating member there can be connected to the rotary member.

Preferably, the rotary member has an axial protrusion directed away from the brake pad for coupling an actuating member.

It is further expedient for the gearing to have a toothing formed on one of the screw members and a pinion co-operating therewith and coupled to the reset shaft. The pinion can mesh directly with the toothing; with large spaces between the housing axis and the axis of the reset shaft however it may be more expedient for the pinion to be connected to the toothing by a tooth belt or a chain or the like. The gearing can also be a worm or worm gear mechanism if for space reasons it is expedient not to arrange the reset shaft parallel but for example at a right angle to the housing axis. The terms toothing and pinion are therefore to be interpreted broadly and not restricted for instance to spur-gear components.

In the known actuator described the blocking of the reset shaft by means of the stirrup is admittedly intended to prevent that the two screw members in operation, with the brake released, can turn with respect to each other unintentionally due to vibrations and thereby undo a preceding adjustment. However, the first screw body is secured against rotation in the sense of increasing the brake clearance only by friction in the pair of threaded adjustment members and by the torque which can be transmitted by the clutch arrangement but is not very large. Under shock-like loads which can act from the brake pads via the second screw member on the first screw member the latter can turn and consequently the brake clearance is increased.

This danger is avoided in a further development of the invention in that the second screw member is fixed against rotation, the first screw member has the toothing co-operating with the pinion and the reset shaft is connected to the pinion via a freewheel clutch which, if the reset shaft is blocked, allows a rotation of the first screw member only in the sense of reducing the brake slack or clearance.

Preferably, the freewheel clutch comprises first and second clutch members, the first one of which is adapted to be fixed within the housing by axial clamping with the reset shaft and the second clutch member is formed on the pinion and is connected to the first clutch member via a spring yielding under overload conditions.

Finally, it is advantageous for the reset shaft and the pinion to have shaped members which on release of the blocking of the reset shaft are adapted to be brought into positive engagement with each other.

An example of embodiment of the invention will be explained hereinafter with the aid of schematic drawings which show further details and in which:

FIG. 1 is a plan view, partially in section, of a spot-type disk brake having an actuator according to the invention, FIG. 2 is an enlarged axial section corresponding to FIG. 1 and FIG. 3 is a vertical cross-sectional view taken substantially on the line III—III of FIG. 2.

The disk brake illustrated is associated with a brake disk 10 and comprises a brake support 12 on which a floating caliper 14 is guided displaceably parallel to the axis of the brake disk. The guides are two bushes 16 which are each secured with a screw 18 to the brake support 12. The floating caliper 14 engages over two brake pads 20 and 22 which are arranged on either side of the brake disk 10 and are each supported on the brake support 12 against entraining forces occurring on braking by a backplate 24 and 26 respectively. For replacement the brake pads 20 and 22 can be withdrawn through the caliper 14 upwardly, towards the observer in FIG. 1, after a stirrup member 28 securing them has been released.

For applying the brake pad 20 to the brake disk 10 an actuator 30 is provided. The second brake pad 22 bears on the caliper 14 and is pressed by reaction forces displacing the caliper 14 against the brake disk 10.

The actuator 30 has a housing 32 which in the example illustrated is formed as part of the floating caliper 14 and comprises a housing axis A normal to the brake disk 10, i.e. parallel to the axis of rotation thereof. Within the housing 32 an annular cam member 34 is disposed on which a spiral first cam surface 36 facing the brake disk 10 is formed. Bearing on said surface via a ball bearing 38 is a bell-shaped rotary member 40 with a likewise spiral second cam surface 42 formed thereon. The rotary member 40 is additionally mounted axially spaced from the ball bering 38 by means of a sliding bearing 44 in the housing 32 and is sealed therebehind by a seal 46 with respect to a first housing cover 48.

A sleeve-shaped first screw member 50 arranged coaxially with the rotary member 40 bears on the latter in the axial direction via a needle bearing 52. A spring disk 54 clamped between the first screw member 50 and a second housing cover 56 ensures that the bearing of said screw member 50 on the rotary member 40 is free from play in the axial direction. The second housing cover 56 is bordered annularly and radially inwardly by a collar 58.

Screwed into th sleeve-shaped first screw member 50 is a mushroom-shaped second screw member 60; this screw connection serves for axial adjustment of the brake pad 22 and will therefore be referred to as a pair of adjustment threads. Between the second screw member and the backplate 24 of the brake pad 20 for improving the distribution of the brake actuating forces a thrust plate 64 is disposed which is axially displaceable with respect to the brake support 12 but secured against rotation. The second screw member 60 is prevented from rotating in that a fixing means in the form of a pin 66 secured axis-parallel thereto engages with slight clearance into a groove 68 perpendicular to the plane of the drawings of FIGS. 1 and 2 in the thrust plate 64.

The rotary member 40 is connected to the first screw member 50 via a clutch arrangement 70. This includes an annular intermediate member 72 which is rotatably mounted in the rotary member 40 and together with the latter surrounds free of play in the radial direction a spiral driver spring 74. The driver spring 74 is coiled such that it transmits to the intermediate member 72 a rotation of the rotary member 40 in one actuating rotary direction but permits rotating back of the rotary member 40 without the intermediate member 72.

The intermediate member 72 is connected to the first screw member 50 via a lamella pack 76, 77 which is held tensioned by an axial pressure spring 78 in such a manner that a rotation of the intermediate member 72 is transmitted frictionally to the first screw member 50 as long as a predetermined torque is not exceeded. The lamella pack 76, 77 consists of lamellae 76 which are connected to the first screw member 50 for axial displacement and joint rotation therewith and of lamellae 77 which are connected axially displaceably to the intermediate member 72. The lamellae 77 each have two tongues 79 which engage with a clearance S in axis-parallel grooves of the intermediate member 72. The clearance S defines the brake slack or clearance.

To actuate the brake an actuating member 80 rod-shaped in the example of embodiment illustrated is provided which with a partially spherical externally toothed head 82 formed thereon engages into a correspondingly internally toothed tubular protrusion 84 of the rotary member 40. The tubular protrusion 84 is freely accessible on the left side of the housing 32 in FIGS. 1 and 2 so that the actuating member 80 can be easily assembled. The complementary toothings which are formed on the head 82 of the actuating member 80 and on the tubular protrusion 84 of the rotary member 40 and which can also be referred to as multi-groove profiles make it possible for the actuating member 80, for compensating production and assembly tolerances and on displacements of the caliper 14, to be pushed to a greater or lesser extent into the tubular protrusion 84. The actuating member 80 thereby and in operation can deviate in a predetermined angular range from the housing axis A as is indicated in dashed lines in FIG. 2.

The first screw member 50 has in the range between the needle bearing 52 and the spring disk 54 a toothing 88 which is formed in the example illustrated as external straight toothing and meshes with a correspondingly toothed pinion 90. The pinion 90 is mounted in spaced parallel relationship to the housing axis A in the housing 32 and is connected via a freewheel clutch 94 to a reset shaft 92 mounted in corresponding manner.

The freewheel clutch 94 includes two pot-shaped clutch members 96 and 98 which bear against each other at their end faces and are matched in their internal and external diameters. The clutch member 96 is mounted as an independent component in the housing 32; the clutch member 98 is however formed on the pinion 90. The two clutch members 96 and 98 surround clearance-free in the radial direction a spring 100 which is so coiled that the freewheel clutch 94 in connection with the pinion 90 does not prevent a rotation of the first screw member 50 in the sense of the rotation of said member necessary to adjust the brake but does prevent a turning back when the clutch member 96 is clamped.

To clamp the clutch member 96 the reset shaft 92 comprises a shoulder 102 bearing axially inwardly on the clutch member 96 and a threaded portion 104 which is arranged outside the housing 32 and onto which a nut 106 is screwed. The freewheel clutch 94 acts in the manner described as long as the nut 106 is tightened. At its outer end with respect to the housing 32 the reset shaft 92 comprises a hexagon 108 or other suitable shape for applying a torque by means of a key or spanner or the like. The inner end of the reset shaft 92 is also formed as shaped member 110 of noncircular profile, in the example of embodiment as hexagonal head, and on the pinion 90 a complementary shaped portion 112 is formed, i.e. in the example of embodiment illustrated a hexagonal hole. When the nut 106 is screwed off, the reset shaft 92 can be displaced into the housing 32 to such an extent that the shaped members 110 and 112 engage into each other and as a result by turning the reset shaft 92 the pinion and thus also the first screw member 50 can be turned in constrained manner in the one or other direction of rotation.

In the operational state of the actuator the nut 106 is tightened and as a result the clutch member 96 is clamped and the shaped members 110 and 112 prevented from engaging in each other. To actuate the brake the rotary member 40 is turned by means of the actuating member 80 in the actuating direction of rotation. The first screw member 50 is then initially also turned by the clutch arrangement 70.

After overcoming the brake clearance the two brake pads 20 and 22 bear on the brake disk 10 which now opposes with a rapidly rising reaction force any further axial displacement of the two screw members 50 and 60. By this reaction force the friction in the pair of adjustment threads 62 is increased so that the clutch arrangement 70 slips and any further rotation of the rotary member 40 thus effects only an additional axial movement of the two screw members 50 and 60 towards the brake disk 10. On releasing the brake after such an actuation the movements described take place in the opposite direction. The spring disk 54 urges the first screw member 50 and with it the rotary member 40 and the second screw member 60 in the axial direction away from the brake disk 10.

If however on actuation of a brake the clearance S is overcome without the brake pads 20 and 22 reaching the brake disk 10 and allowing a correspondingly high reaction force to occur this is a sign that at least one of the brake pads is worn to such an extent that adjustment is necessary. In this case the first screw member 50 is further turned via the clutch arrangement 70 by the rotary member 40 in the actuating direction of rotation thereof, the freewheel clutch 94 slipping and thus not preventing the rotation of the first screw member 50 whilst the engagement of the pin 66 on the wall of the hole 68 prevents the second screw member 60 from rotating further. By this relative rotation of the two screw members 50 and 60 with respect to each other the second screw member 60 is screwed out of the first screw member 50 and the brake is thus adjusted.

To release the brake after such an actuation involving an adjustment the rotary member 40 is turned by means of the actuating member 80 in the opposite direction; when this is done however the first screw member 50 is prevented by the friction occurring at the spring disk 54, and above all, however, by the now blocking freewheel clutch 94, from turning itself back together with the rotary member 40. Thus, the adjustment made on actuation of the brake is retained after release of the brake. This applies even when the actuator or any of its components is subjected to vibrations in operation, such vibrations being caused principally by engine vibrations and irregular road surfaces.

Thus, during the life of the brake pads 20 and 22 the second screw member 60 is screwed stepwise increasingly further out of the first screw member 50 until finally the brake pads must be replaced. For this purpose in the manner described the nut 106 is released, the reset shaft 92 is brought into direct engagement with the pinion 90 and then turned in such a manner that the two screw members 50 and 60 are screwed into each other again until they have reached the starting position shown in the drawings. The nut 106 is then again tightened and the brake can be used again with the new brake pads 20 and 22.

I claim:

1. An actuator with automatic adjustment for use in brakes, especially of heavy duty vehicles, comprising
   a housing (32) having a housing axis (A) and enclosing a first cam surface (36) arranged circularly around said axis,
   a rotary member (40) which is rotatable about the housing axis (A) and which has a second cam surface (42) with which said rotary member is supported at the first cam surface (36) to cause an axial displacement dependent on its rotation,
   a first screw member (50) rotatable about the housing axis (A),
   a second screw member (60) which is constructed so as to exert an actuating force onto a brake pad (20) and which is threadedly connected with the first screw member (50),
   a clutch (70) constructed and arranged to transmit a limited torque in one rotational direction from the rotary member (40) to the first screw member (50) for the axial adjustment of the brake pad (20) and allowing a counter-rotational movement of the rotary member (40) independently of the first screw member (50), and
   a reset shaft (92) journalled within the housing (32) to permit selective back-screwing of the two screw members (50, 60) with respect to each other for replacing the brake pad (20), and means (100, 102) for blocking said reset shaft (92) to prevent positively during normal use of the actuator any unintended back-screwing of said two screw members (50, 56) while not preventing forward screwing of said members during automatic adjustment,
   characterized in that the reset shaft (92) is disposed with lateral spacing from the housing axis (A) and is connected with one of the screw members (50) via a gearing (88, 90), said gearing (88, 90) having a toothing (88) formed on one of the screw members (50) and a pinion (90) cooperating therewith and coupled with the reset shaft (92).

2. The actuator as defined in claim 1 characterized in that the rotary member (40) has an axial protrusion (84) directed away from the brake pad (20) for coupling an actuating member (80).

3. The actuator as defined in claim 1 characterized in that the second screw member (60) is fixed against rotation by a fixing means, that the first screw member (50) has the toothing (88) cooperating with the pinion (90), and that the reset shaft (92) is connected within the pinion (90) via a freewheel clutch (94) which, when the reset shaft (92) is blocked, allows a rotation of the first screw member (50) only in the sense of reducing the brake slack.

4. The actuator as defined in claim 3 characterized in that the freewheel clutch (94) comprises first and second clutch members (96, 98), the first one (96) of which is adapted to be fixed within the housing (32) by axially clamping it with the reset shaft (92), and that the second clutch member (98) is formed at the pinion (90) and is connected with the first clutch member (96) via a spring (100) yielding under overload conditions.

5. The actuator as defined in claims 3 or 4 characterized in that the reset shaft (92) and the pinion (90) have members (110, 112) which are adapted to be brought into positive engagement with each other upon selective release of the blocking of the reset shaft (92).

* * * * *